(12) United States Patent
Low et al.

(10) Patent No.: US 6,243,443 B1
(45) Date of Patent: Jun. 5, 2001

(54) METHOD OF MAKING AVAILABLE CONTENT RESOURCES TO USERS OF A TELEPHONE NETWORK

(75) Inventors: Colin Low, Wootton-under Edge; Andrew Franklin Seaborne, Bristol, both of (GB); Nicolas Bouthors, Meylan (FR); Ulf Beyschlag, Claix (FR); Nicolas Raguideau, Meylan (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/125,391

(22) PCT Filed: Feb. 20, 1997

(86) PCT No.: PCT/GB97/00469

§ 371 Date: Dec. 24, 1998

§ 102(e) Date: Dec. 24, 1998

(87) PCT Pub. No.: WO97/31491

PCT Pub. Date: Aug. 28, 1997

(30) Foreign Application Priority Data

Feb. 20, 1996 (GB) .................................................. 9603582

(51) Int. Cl.[7] .................................................... H04M 1/64
(52) U.S. Cl. ...................... 379/88.17; 379/900; 379/207; 379/88.17
(58) Field of Search .............................. 379/88.13, 88.14, 379/88.17, 900, 207, 221, 230

(56) References Cited

U.S. PATENT DOCUMENTS

| 4,659,877 | 4/1987 | Dorsey et al. . |
| 5,351,276 | 9/1994 | Doll, Jr. et al. ........................ 379/67 |
| 5,423,003 | 6/1995 | Berteau . |

(List continued on next page.)

FOREIGN PATENT DOCUMENTS

| 0 654 930 A1 | 5/1993 | (EP) . |
| 0 654 930 | 5/1995 | (EP) . |
| 0 724 368 | 12/1995 | (EP) . |
| 0 724 368 A2 | 7/1996 | (EP) . |
| WO 96/09714 | 3/1996 | (WO) . |
| WO 96/20553 | 7/1996 | (WO) . |
| WO 96/38018 | 11/1996 | (WO) . |
| WO 96/38962 | 12/1996 | (WO) . |
| WO 97/16007 | 5/1997 | (WO) . |
| WO 97/20424 | 6/1997 | (WO) . |
| WO 97/26749 | 7/1997 | (WO) . |
| WO97/32427 | 9/1997 | (WO) . |
| WO94/23523 | 3/2001 | (WO) . |

OTHER PUBLICATIONS

Swale & Lovett, "Convergence of Public and Private IN", *BT Technology Journal*, 1992.

Swale, R., "Virtual Networks of the Future—Converging Public and Private IN", *BT Technology Journal*, 1993.

Swale & Chesterman, "Distributed intelligence and data in public and private networks", *BT Technology Journal*, 1995.

Berners–Lee, Tim, "Hypertext Transfer Protocol—HTTP/1.0," HTTP Working Group Internet Draft (Oct. 14, 1995).

(List continued on next page.)

*Primary Examiner*—Creighton Smith (57) ABSTRACT

Content items (49) are held on Internet servers (51) with each item being locatable at a corresponding URI and having an associated identifying number ("1234567") that can be input using a telephone keypad. A PSTN is provided with an intelligent peripheal (70) that has connectivity with the Internet (50). To access a particular content item (49), a telephone user (A) inputs a service designator code ("333") followed by the identifying number ("1234567") of the required content item (49). The intelligent peripheral (70) translates the input identifying number to the URI of the required item. This URI is then used by the intelligent peripheral (70) to retrieve the required content item and deliver it to the telephone user (A), typically as a speech rendition of the item.

25 Claims, 5 Drawing Sheets

U.S. PATENT DOCUMENTS

| | | |
|---|---|---|
| 5,438,568 | 8/1995 | Weisser, Jr. . |
| 5,452,350 | 9/1995 | Reynolds et al. . |
| 5,546,452 | 8/1996 | Andrews et al. . |
| 5,703,940 | 12/1997 | Sattar et al. . |
| 5,708,780 | 1/1998 | Levergood et al. . |
| 5,799,063 * | 8/1998 | Krane ............................. 379/88.17 X |
| 5,799,317 | 8/1998 | He et al. ............................... 707/104 |
| 5,802,146 | 9/1998 | Dulman . |
| 5,812,656 | 9/1998 | Garland et al. . |
| 5,838,682 | 11/1998 | Dekelbaum et al. . |
| 5,838,768 * | 11/1998 | Sumar et al. ................. 379/88.17 X |
| 5,873,077 | 2/1999 | Kanoh et al. ............................ 707/3 |
| 5,953,392 * | 9/1999 | Rhie et al. ..................... 379/88.17 X |
| 5,966,427 | 10/1999 | Shaffer et al. . |
| 6,014,437 | 1/2000 | Acker et al. . |
| 6,021,126 | 2/2000 | White et al. .......................... 370/352 |
| 6,023,724 | 2/2000 | Bhatia et al. ......................... 709/218 |
| 6,026,441 | 2/2000 | Ronen .................................. 709/227 |
| 6,029,203 | 2/2000 | Bhatia et al. ......................... 709/244 |
| 6,067,516 | 5/2000 | Levay et al. . |
| 6,084,956 | 7/2000 | Turner et al. . |
| 6,125,113 * | 9/2000 | Farris et al. .................. 379/88.17 X |
| 6,141,413 * | 10/2000 | Waldner et al. .............. 379/88.17 X |

OTHER PUBLICATIONS

Kabay, S., et al., "The Service Node—An Advanced IN Services Element," *BT Technology Journal* vol. 13 No. 2, pp. 64–72 (1995).

Low, Colin, et al., "WebIN—An Architecture for Fast Deployment of IN–based Personal Services," Proceedings of IN '96, Melbourne (Apr. 1996).

Low, Colin, "The Internet Telephony Red Herring," HP Laboratories Technical Report (May 15, 1996).

Mockapetris, P., "Domain Names—Concepts and Facilities," RFC 1034 (DNS) (Nov. 1987).

Swale, R.P., et al., "Convergence of Public and Private IN," *BT Laboratories*, pp. 216–221 (Mar. 1992).

Swale, R.P., et al., "Virtual Networks of the Future—Converging Public and Private IN," *The Institution of Electrical Engineers*, pp. 6/1–6/5 (Oct. 1993).

Swale, R.P., et al., "Distributed Intelligence and Data in Public and Private Networks,"*BT Technology Journal*, vol. 13 No.2, pp. 94–104 (Apr. 1995).

Comer, D.E., "Internetworking With TCP/IP vol. 1: Principles, Protocals, and Architecture," N.J., Prentice–Hall, Inc., 1991. pp. 329–330.

Mach2 DNS (Domain Name Services) Module (Jun. 13, 1995), Au–A–11045/97 Citation b.

Muffett, A., "Proper Care and Feeding of Firewalls," Sun Microsystems, UK (Nov. 14, 1994) pp. 1–12.

S. Kabay & C.J. Sage, "The Service Node—an advanced IN services element", *BT Technology Journal*, Apr. 1995.

Berners–Lee, et al, "Hypertext Transfer Protocol—HTTP/1.0", *HTTP Working Group Internet Draft*, Oct. 1995.

P. Mockapetris, "Domain Names—Concepts and Facilities", *RFC 1034—Network Working Group*, Nov. 10987.

T. Eckardt, et al., "On the Personal Communications Impacts on Multimedia Teleservices", *Technical University of Berlin*, 1994.

ISS '95 World Telecommunications Congress, vol. 2, Apr. 23, 1995, Berlin DE, pp. 41–44, XP000495622 Sevcik et al.: "Customers in driver's seat: Private Intelligent Network Control Point".

*Globecom '93*, vol. 3, Nov. 29, 1993, Houston US, pp. 1911–1917, XP000436141 Yang et al.: "The design and implementation of a Service Logic Executive Environment platform".

*Electronics & Communications in Japan, Part I—Communications*, vol. 76, No. 1, Jan. 1993 New York US, pp. 34–44, XP000408623 Esaki et al.: "Abstraction and Control of Transport Network Resources for Intelligent Networks".

*IEEE Globecom*, vol. 2, Nov. 28, 1994–Dec. 2, 1994, San Francisco US, pp. 876–880, XP000488664 Chang et al.: "Rapid deployment of CPE–based telecommunications services".

Netphonic Communications, Inc. The Netphonic Press Release (2 pages), News Release: Mar. 4, 1996 "Web–on–Call Voice Browser Redefines Access to the Web". pp. 1 and 2 Nov. 13, 1997.

*Bell Labs Technical Journal—Winter 1997* The Bell Labs Article (17 pages) "Integrated Web and Telephone Service Creation" David L. Atkins, et al pp. 19–35.

* cited by examiner

METHOD OF MAKING AVAILABLE CONTENT RESOURCES TO USERS OF A TELEPHONE NETWORK

FIELD OF THE INVENTION

The present invention relates to a method of making available content resources to users of a telephone network.

As used herein, the term "telephone network" means a system, such as a PSTN, PLMN or private telephone network, which comprises a bearer network with switches for setting up a bearer channel through the network between end-user telephone equipment (including fax and similar items capable of dialing a telephone number). Reference to a "call" in the context of a telephone network is to be understood as meaning a communication through a bearer channel set up across the network, whilst references to call setup, maintenance and takedown are to be taken to mean the processes of setting up, maintaining and taking down a bearer channel through the bearer network. Terms such as "call processing" and "call handling" are to be similarly interpreted.

BACKGROUND OF THE INVENTION

Telecommunication companies running PSTNs (Public Switched Telephone Networks) and PLMNs (Public Land Mobile Networks) are in the business of providing communication services and in doing so are providing increasing built-in intelligence in the form of "IN services" such as 800 number services and call forwarding. In contrast, the World Wide Web (WWW), which has seen explosive growth in recent times, is an example of an Internet-based global network providing complex information services. These two worlds, that of the large communications utilities and that of the highly dynamic, pioneer-spirit WWW information culture, are uneasy companions and each plans to encroach on the domain previously occupied by the others; thus telephony services will be offered over the WWW and information services over the public communication infrastructure.

The present invention proposes technologies for a more synergetic relationship between these two worlds than is currently envisaged and in order to place the present invention in context, a review will first be given of each of these two worlds.

Telephone Networks with IN Services

Figure 1:
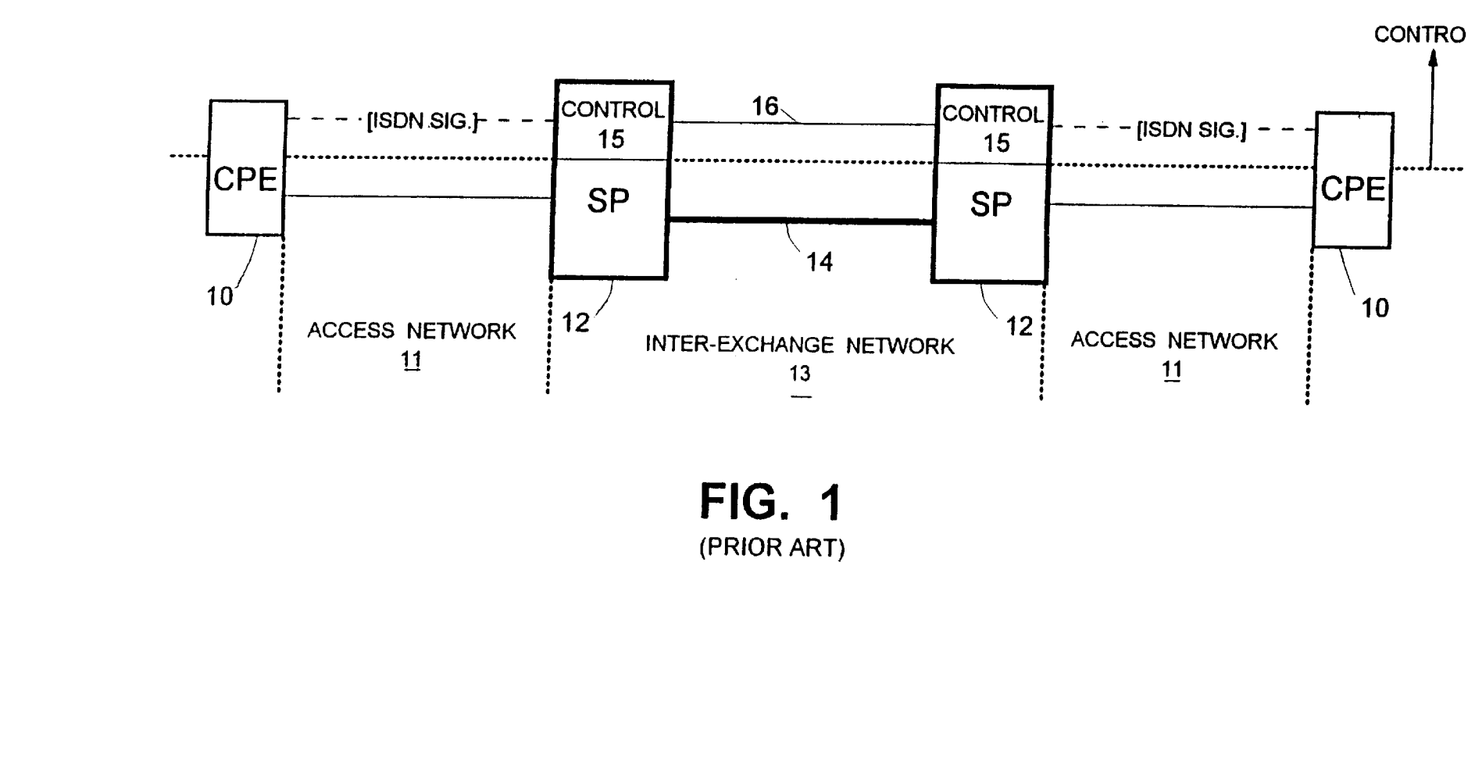
FIG. 1 is a simplified diagram of a standard PSTN.

The Basic PSTN. The basic service provided by a PSTN (Public Switched Telephone Network) is the interconnection of two telephones (that is, setting up a bearer channel between the telephones) according to a called-party telephone number input at the calling-party telephone. FIG. 1 is a simplified representation of a PSTN providing such a service. In particular, customer premises equipment, CPE, 10 (such as standard analogue telephones, but also more recently ISDN terminals) are connected through an access network 11 to switching points, SPs 12. The SPs 12 form nodes in an inter-exchange network 13 made up of inter-connecting trunks 14 and SPs that are controlled by control entities 15 in the SPs. The control effected by the control entities 15 is determined by signalling inputs received from the CPEs and other SPs, and involves call setup, maintenance and clearance to provide the desired bearer channel between calling CPE and called CPE. Conceptually, the PSTN may be thought of as a bearer network and a control (signalling) network, the function of the latter being to effect call control through the bearer network, namely the control of setup, maintenance and take down of bearer channels through the bearer network; in practice, the bearer and signalling networks may use the same physical circuits and even the same logical channels.

Thus, where the CPE is a traditional dumb telephone, control signalling between the CPE and its local SP is in-band signalling, that is, the signalling is carried on the same channel as used for voice; this signalling is interpreted and converted at the SPs 12 into signalling between SPs that uses a dedicated common-channel signalling network 16 (implemented nowadays using the SS7 protocol suite). Where the CPE is an ISDN terminal, signalling is carried in a separate channel directly from the CPE on an end-to-end. Modern SPs use the ISUP (ISDN User Part) SS7 protocol for inter-exchange call control signalling whether the CPE is a standard telephone or an ISDN terminal.

Intelligent Networks. In addition to basic call handling, an SP may also serve to provide what are called IN (Intelligent Network) services; in this case the SP is termed a service switching point, SSP. An SSP 25 is arranged to suspend call processing at defined points-in-call upon particular criteria being met, and to delegate the continuation of call processing to a service control subsystem providing a service control function (SCF) either in the form of a service control point, SCP 17 (see FIG. 2) or an Adjunct 18. The Adjunct 18 is directly associated with an SSP 25 whilst the SCP 17 and SSP 25 communicate with each other via an extended common channel signalling (CCS) network 16 that may include signal transfer points (STP) 19. The SCP 17 may be associated with more than one SSP 25. Both the SCP 17 and Adjunct 18 provide a service logic execution environment (SLEE) 20 in which instances of one or more service logic programs (SLP) 21 can execute. The SLEE 20 and SLP 21 together provide service control functionality for providing services to the SSP 25.

Figure 2:
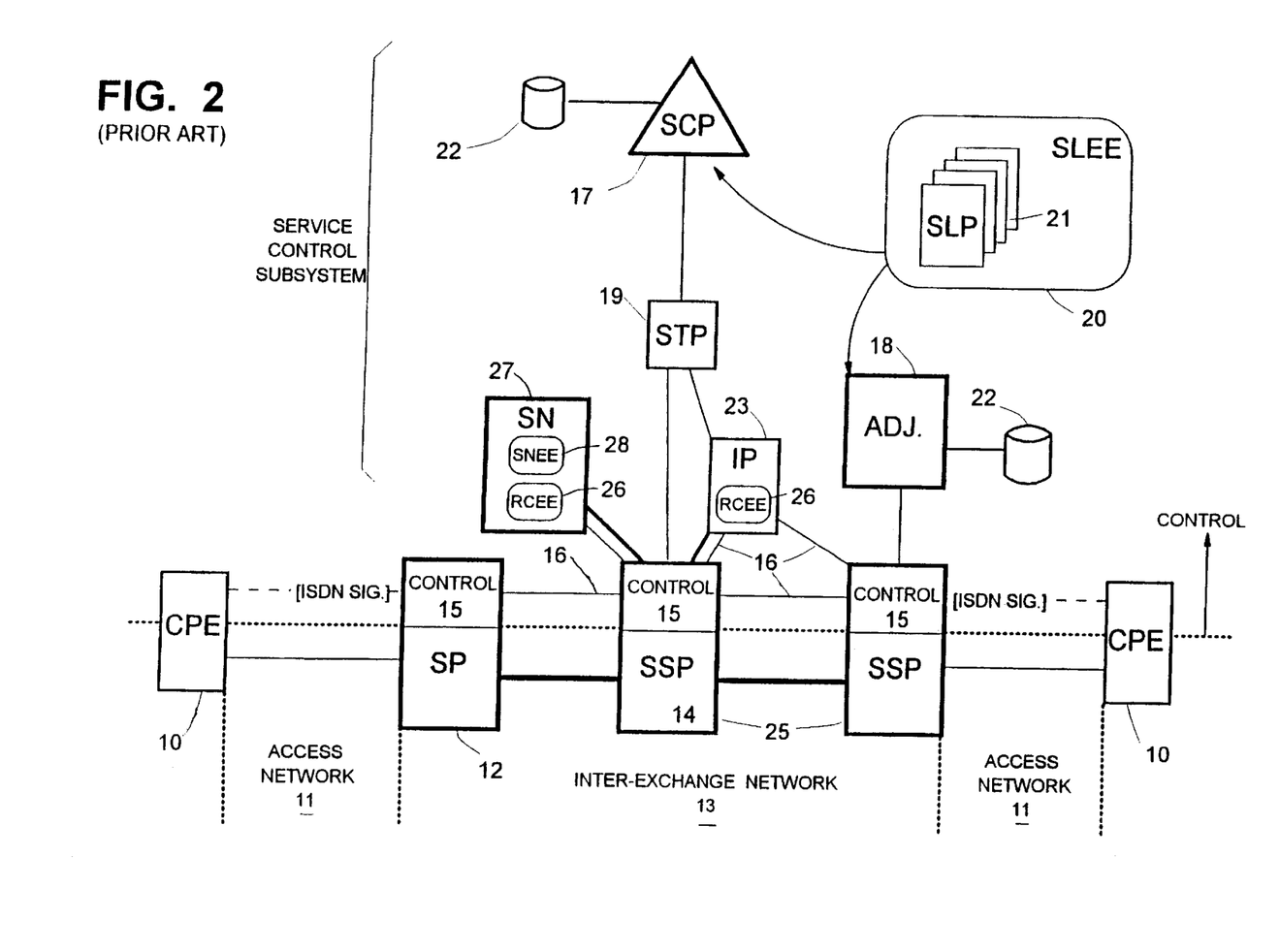
FIG. 2 is a simplified diagram of a known PSTN with IN service capability.

Service logic running in an SCP or Adjunct will generally make use of subscriber information stored in a service data function (SDF) 22 that may be integral with the SCP/Adjunct or partially or wholly separate therefrom. The service data function (SDF), like the service control function (SCF) forms part of the service control subsystem of the PSTN. It may be noted that some or all of the service control function may be built into the PSTN switches themselves.

In operation, when the SSP 25 receives a call, it examines internal trigger conditions and, possibly, user information (eg dialed digits) to ascertain if the call requires a service to be provided by the service control subsystem 17, 18; the checking of trigger conditions may be carried out at several different points in call processing. Where the SSP 25 determines that a service is required it messages the service control subsystem (either SCP 17 or Adjunct 18) requesting the desired service and sending it a logic representation of the call in terms of its connectivity and call processing status. The service control subsystem then provides the requested service and this may involve either a single interaction between the SSP and service control subsystem or a session of interactions. A typical service is call forwarding which is a called-party service giving expression to an end-user requirement as simple as "if you call me on number X and it rings ten times, try calling number Y". In this case, it is the SSP local to the called end-user that triggers its associated SCP (or Adjunct) to provide this service; it will, of course, be appreciated that the SSP must be primed to know that the service is to be provided for a called number X.

In addition to the SCP 17 and Adjunct 18, the FIG. 2 network includes an intelligent peripheral (IP) 23 that has bearer-channel connectivity to one or more SSPs 25. The IP 23 provides resources needed to exchange information with an end user, such as voice announcements and DTMF digit collection capabilities (this type of non-signalling information intended to be passed over a bearer-channel to/from the end user is referred to below generally as "content"). These IP resources are managed and controlled by a resource control execution environment (RCEE) 26 of the IP 23 in response to input received from an SSP 25. Such input may result, for example, from the service control subsystem (SCP 17, Adjunct 18), during execution of an SLP 21, requiring a voice announcement to be played to an end user; in this case the service control subsystem passes this requirement to the SSP concerned which sets up a bearer channel to the IP 23 and commands the IP to play the required announcement. It is also possible to arrange for the service control subsystem to communicate directly over the CCS network with an IP rather than going though an SSP 25.

IP functionality and resources may also be provided within a service node (SN) which like an IP has bearer-channel connectivity to an SSP; however, an SN additionally includes a service node execution environment (SNEE) 28, similar to SLEE 20, for running service logic programs. An SN can thus provide a range of services virtually autonomously once an SSP has switched through a call to the SN; in particular, an SN is apt to provide services such as voice mail, automated attendant and fax server, all of which require substantial transfer of content to/from an end user. The IP functionality and resources of an SN are generally not under the exclusive control of the SNEE of the SN but can be used by remote SLEEs. To the extent that an SN can execute specific types of SLPs, it forms part of the service control subsystem of the network.

The network will also include an operation system (not shown) that has a general view of the network and its services and performs functions such as network monitoring and control.

The above-described model for the provision of IN services in a PSTN can also be mapped onto PLMNs (Public Land Mobile Networks) such as GSM and other mobile networks. Control signalling in the case of a mobile subscriber is more complex because in addition to all the usual signalling requirements, there is also a need to establish where a call to a mobile subscriber should be routed; however, this is not a very different problem from a number of called-party IN services in the PSTN. Thus in GSM, the service data function (SDF) is largely located in a system named a Home Location Register (HLR) and the service control function in a-system named a Visitor Location Register (VLR) that is generally associated on a one-to-one basis with each SSP (which in GSM terminology is called a Mobile Switching Centre, MSC).

Because subscribers are mobile, the subscriber profile is transported from the HLR to whichever VLR happens to be functionally closest to be mobile subscriber, and from there the VLR operates the (fixed) service using the subscriber profile and interacts with the SSP. The HLR and VLR thus constitute a service control subsystem similar to an SCP or Adjunct with their associated databases.

It is, of course, also possible to provide IN services in private telephone systems and, in this case, the service control function and service data function are generally either integrated into a PABX (Private Automatic Branch Exchange) or provided by a local computer. The service control subsystem, whilst present, may thus not be a physically distinct from the PABX.

The above-described general architectural framework for providing IN services has both strengths and flaws. Its main strength is that it works and many services have been successfully deployed, such as 800 number services, credit card calling, voicemail, and various call waiting and redirection services. However, despite years of standardisation, services are still implemented one-at-a-time on proprietary platforms and do not scale well. The approach has been based on large, fault-tolerant systems which provide services for hundreds of thousands or even millions of subscribers and take years to deploy. Furthermore, since the networks used to support these services also constitute the basic telephone infrastructure, anything attached to these networks must be rigorously vetted. Additionally, each country and operator tends to have local variations of the so-called standards making it difficult to supply standard products and thereby braking the dynamics of competition.

The World Wide Web

In contrast to the slow deliberate progress of the telephone infrastructure, the WWW has grown explosively from its inception in 1989 to become the primary electronic information distribution service in terms of spread, availability and richness of information content. Anyone can, for a modest outlay, become an information provider with a world-wide audience in a highly interconnected information architecture.

The WWW is a client-server application running over the Internet and using a client-server protocol which mandates only the simplest of exchanges between client and server. This protocol is HTTP (Hyper Text Transfer Protocol) which is optimised for use over TCP/IP networks such as the Internet; the HTTP protocol can, however, also be used over networks using different communication protocol stacks.

Since the availability of literature concerning the WWW has seen the same sort of growth as the WWW itself, a detailed description of the WWW, HTTP and the Internet will not be given herein. An outline description will, however, be given with attention being paid to certain features of relevance to the present invention.

The WWW uses the Internet for interconnectivity. Internet is a system that connects together networks on a world-wide basis. Internet is based on the TCP/IP protocol suite and provides connectivity to networks that also use TCP/IP. For an entity to have a presence on the Internet, it needs both access to a network connected to the Internet and an IP address. IP addresses are hierarchically structured. Generally an entity will be identified at the user level by a name that can be resolved into the corresponding IP address by the Domain Name System (DNS) of the Internet.

Figure 3:
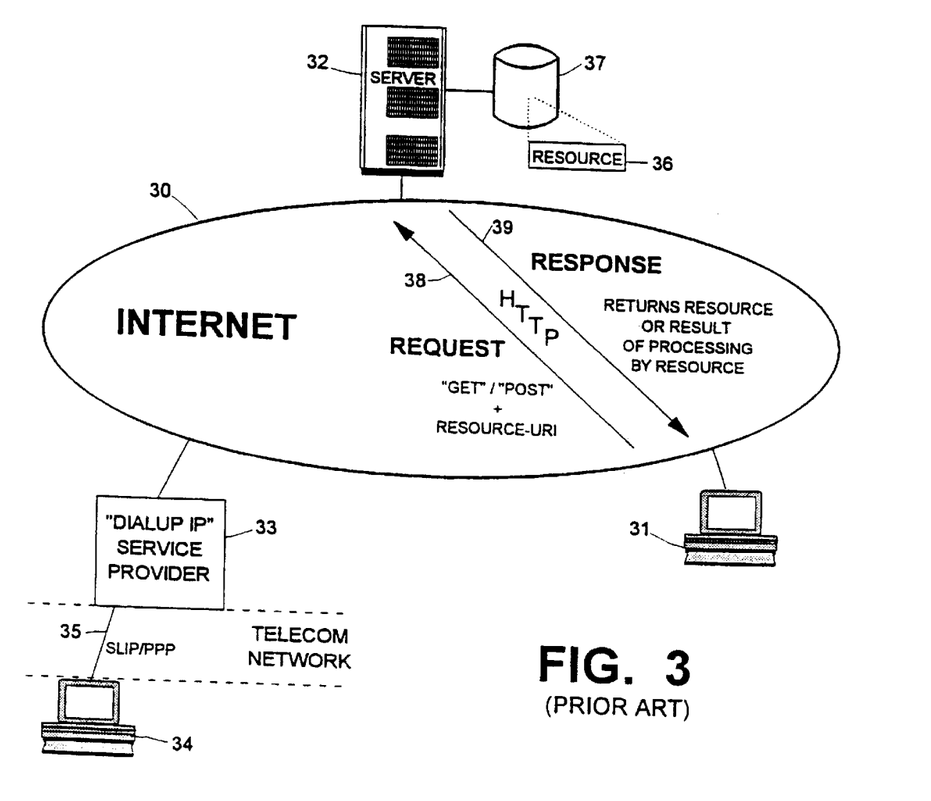
FIG. 3 is a diagram illustrating the functioning of the World Wide Web.

Operation of the WWW Referring now to FIG. 3 of the accompanying drawings, access to the Internet 30 may be by direct connection to a network that is itself directly or indirectly connected to the Internet; such an arrangement is represented by terminal 31 in FIG. 3 (this terminal may, for example, be a Unix workstation or a PC). Having a connection to the Internet of this form is known as having 'network access'. Any entity that has network access to the Internet may act as a server on the Internet provided it has sufficient associated functionality; in FIG. 3, entity 32 with file store 37 acts as a server.

Many users of the WWW do not have network access to the Internet but instead access the Internet via an Internet service provider, ISP, 33 that does have network access. In this case; the user terminal 34 will generally communicate with the ISP 33 over the public telephone system using a modem and employing either SLIP (Serial Line Interface Protocol) or PPP (Point-to-Point Protocol). These protocols allow Internet packets to traverse ordinary telephone lines. Access to the Internet of this form is known as "dialup IP"

access. With this access method, the user terminal 34 is temporarily allocated an IP address during each user session; however, since this IP address may differ between sessions, it is not practical for the entity 34 to act as a server.

A cornerstone of the WWW is its ability to address particular information resources by means of an Uniform Resource Identifier (URI) that will generally be either a Uniform Resource Locator (URL) that identifies a resource by location, or a Uniform Resource Name (URN) that can be resolved into an URL. By way of example, a full or "absolute" URL will comprise the following elements:

scheme—this is the access scheme to be used to access the resource of interest;

host—the Internet host domain name or IP address;

port—the host port for the (TCP) connection;

abs-path—the absolute path of the resource on the host.
In fact, the 'port' may be omitted in which case port 80 is assumed.

Figure 4:
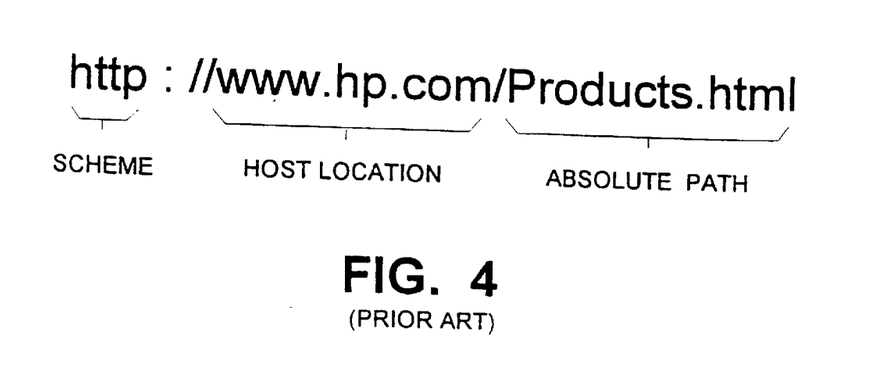
FIG. 4 is a diagram illustrating the format of a standard URL.

FIG. 4 of the accompanying drawings shows an example URL for the Hewlett-Packard products welcome page. In this case, the elements are:

scheme—http host—www.hp.com port—omitted (port 80 assumed)

abs-path—Products.html

The HTTP protocol is based on a request/response paradigm. Referring again to FIG. 3 of the drawings, given a particular URI identifying a resource 30 to be accessed, a client establishes a connection with the server 31 corresponding to the "host" element of the URI and sends a request to the server. This request includes a request method, and the "Request-URI" (which is generally just the absolute path of the resource on the server as identified by the "abs-path" element of the URI); the request may include additional data elements. The server 31 then accesses the resource 36 (here held on storage 37) and responds and this response may include an entity of a type identified by a MIME (Multipurpose Internet Mail Extensions) type also included in the response.

The two main request methods are:

GET—This method results in the retrieval of whatever information (in the form of an entity) is identified by the Request-URI. It is important to note that if the Request-URl refers to a data-producing process, it is the produced data which is returned as the entity in the response and not the source text of the process.

POST—This method is used to request that the destination server accept the entity enclosed in the request as a new subordinate of the resource identified by the Request-URI. The POST method can be used for annotation of exiting resources, providing a message to a bulletin board, providing data to a data-handling process (for example, data produced as the result of submitting a form), and extending a database through an append operation.

In summary, the GET method can be used to directly retrieve data, or to trigger any process that will return an entity (which may either be data or a simply an indication of the result of running the process). The POST method is used for registering data and specifying this method is also effective to trigger a process in the server to handle the posted data appropriately.

The passing of information to a process triggered to run on a server using either the GET or POST method is currently done according to an interface called the Common Gateway interface (CGI). The receiving process is often written in a scripting language though this is not essential. Typically, the triggered server script is used for interfacing to a database to service a query included in a GET request. Another use, already referred to, is to append data associated with a POST request to a database.

Other important factors in the success of the WWW is the use of the HyperText Markup Language (HTML) for representing the makeup of documents transferred over the WWW, and the availability of powerful graphical Web browsers, such as Netscape and Mosaic, for interpreting such documents in a client terminal to present them to a user. Basically, HTML is used to identify each part of a document, such as a title, or a graphic, and it is then up to the browser running in the client terminal to decide how to display each document part. However, HTML is more than this—it also enables a URI and a request method to be associated with any element of a document (such as a particular word or an image) so that when a user points to and clicks on that element, the resource identified by the URI is accessed according to the scheme (protocol) and request method specified. This arrangement provides a hyperlink from one document to another. Using such hyperlinks, a user at a client terminal can skip effortlessly from one document downloaded from a server on one side of the world, to another document located on a server on the other side of the world. Since a document created by one author may include a hyperlink to a document created by another, an extremely powerful document cross-referring system results with no central bureaucratic control.

Hyperlinks are not the only intelligence that can be built into an HTML document. Another powerful feature is the ability to fill in a downloaded "Form" document on screen and then activate a 'commit' graphical button in order to have the entered information passed to a resource (such as a database) designed to collect such information. This is achieved by associating the POST request method with the 'commit' button together with the URI of the database resource; activating the 'commit' button results in the entered information being posted to the identified resource where it is appropriately handled.

Another powerful possibility is the association of program code (generally scripts to be interpreted) with particular documents elements, such as graphical buttons, this code being executed upon the button being activated. This opens up the possibility of users downloading program code from a resource and then running the code.

It will be appreciated by persons skilled in the art that HTML is only one of several currently available scripting languages delivering the functionality outlined above and it may be expected that any serious Web browser will have built-in support for multiple scripting languages. For example, Netscape 2.0 supports HTML 3.0, Java and Live-Script (the latter being Netscape proprietary scripting Language).

The importance of the role of the graphical Web browser itself should not be overlooked. As well as the ability to support multiple scripting languages, a Web browser should provide built-in support for standard media types, and the ability to load and execute programs in the client, amongst other features. These browsers may be viewed as operating systems for WWW interaction.

WWW and the Telephone Network

It is possible to provide a telephony service over the Internet between connected terminals by digitising voice input and sending it over the Internet in discrete packets for reassembly at the receiving terminal. This is an example of a communication service on the Internet. Conversely, it is possible to point to a variety of information services provided over the telephone system, such as the Minitel system widely available in France. However, these encroachments into each anothers traditional territories pose no real threat to either the Internet or the public telephone system.

Of more interest are areas of cooperative use of the Internet and the telephone system. In fact, one such area has existed for some considerable time and has been outlined above with reference to FIG. 4, namely the use of a modem link over the PSTN from a user computer 34 to an Internet service provider 33 in order to obtain dialup IP access to the Internet. This cooperative use is of a very simple nature, namely the setting up of a bearer channel over the PSTN for subsequently generated Internet traffic; there is no true interaction between the Internet and the PSTN.

Another known example of the cooperative use of the Internet and PSTN are the services by which an Internet user with a sound card in his/her terminal computer can make a voice call to a standard telephone anywhere in the world. This is achieved by transferring digitised voice over the Internet to a service provider near the destination telephone; this service provider then connects into the local PSTN to access the desired phone and transfers across into the local PSTN the voice traffic received over the Internet. Voice input from the called telephone is handled in the reverse manner. Key to this service is the ability to identify the service provider local (in telephony charging terms) to the destination phone. This arrangement, whilst offering the prospect of competition for the telecom operators for long distance calls, is again a simple chaining together of the Internet and PSTN. It may, however, be noted that in this case it is necessary to provide at least a minimum of feedback to the Internet calling party on the progress of call set to the destination telephone over the PSTN local to that telephone; this feedback need only be in terms of whether or not the call has succeeded.

It is an object of the present invention to provide improved access for telephone users to information resources available on the Internet.

SUMMARY OF THE INVENTION

According to one aspect of the present invention, there is provided a method of making available content resources to users of a telephone network, said content resources being provided on at least one server connected to a computer network that is generally accessible to users of the telephone network but logically distinct therefrom, and said content resources each being associated with a respective predetermined code and being locatable on said computer network by corresponding known URIs; said method including the steps of:

(a) during the course of a call involving a user telephone connected to said telephone network, determining conditions indicative that a said content resource is to be accessed;

(b) where step (a) indicates that a said content resource is to be accessed, using at least a part of one of:
a number dialed from said user telephone, and
the telephone number of said user telephone, in forming the said predetermined code of the required said content resource;

mapping said predetermined code to the said known URI of the content resource associated with that predetermined code; and (d) utilising the URI derived in step (d) to access the required content resource over said computer network.

(e) transferring content through said networks in at least one direction between said content resource and said telephone.

It will be appreciated that the term "dialed" is intended to cover the keying in of a number by using a keypad (such as the 12-key keypad commonly provided on modern telephones) or equivalent methods for inputting standard dialling information (for example, devices for emitting DTMF signals corresponding to particular stored numbers).

The content resource may be a content source holding a downloadable content item, or a content sink to which a content item can be transmitted from the user's telephone.

In one embodiment of the invention, step (a) is carried out during call setup or takedown and is done within the telephone network, access to the required content resource being controlled by the telephone network with at least steps (d) and (e) involving Intelligent Peripheral functionality of the telephone network that has connectivity to the computer network.

In another embodiment, step (a) is carried out after call set up through the telephone network to ISP equipment that has connectivity both to said telephone network and to said computer network, access to the required content resource being controlled by the ISP equipment.

According to another aspect of the present invention, there is provided a telephone network comprising a bearer network with service switching points, a service control subsystem, and intelligent peripheral functionality; characterised in that:

said intelligent peripheral functionality is connected to a computer network that is generally accessible to users of the telephone network but logically distinct therefrom;

said service switching point includes means for determining during call setup involving a user telephone connected to said bearer network, conditions indicative that a content-item access service is required involving accessing a content item provided at a particular URI on a server connected to said computer network, said content item having an associated predetermined code;

said service control subsystem includes means responsive to the service switching point determining that said content-item access service is required, to form said predetermined code using at least a part of a number dialed from said user telephone;

one of said service control subsystem and intelligent peripheral functionality has mapping means for mapping said predetermined code to the said particular URI of the content item to be accessed; and said intelligent peripheral functionality is operative to use the URI derived by said mapping means to access the required content item over said computer network and transfer it to said user telephone.

It is to be understood that reference in the foregoing statements of invention to the computer network being logically distinct from the telephone network is not to be taken to imply that there is physical separation of the two—indeed, there will frequently be joint use of the same physical infrastructure. Furthermore, not only may bearer channels set up in the telephone network share the same transmission medium as the computer network, but such a bearer channel may act as a pipe for traffic across the computer network. As regards the computer network being generally accessible to users of the telephone network, this should not be construed that all users of the telephone network have such access or can get such access; rather, it should be understood as meaning that a significant proportion of these users have or can obtain access to the computer network. The intention is to exclude computer networks that are dedicated to the management or monitoring of the bearer network and effectively form part of the telephone network itself.

By way of example, in one case the computer network generally accessible to users of the telephone network but logically distinct from it, may be the Internet and the telephone network may be a public telephone network (PSTN or PLMN). In another case, the telephone network may be a private system including a PABX, and the computer network may be an intranet.

Preferably, where URIs are referred to in the foregoing, these URIs are URLs and/or URNs. Furthermore, the servers referred to are preferably HTTP servers with the service resource items being provided by users on their "Web pages".

BRIEF DESCRIPTION OF THE DRAWINGS

Embodiments of the present invention will now be described, by way of non-limiting example, with reference to the accompanying diagrammatic drawings, in which.

BEST MODE OF CARRYING OUT THE INVENTION

Figure 5:
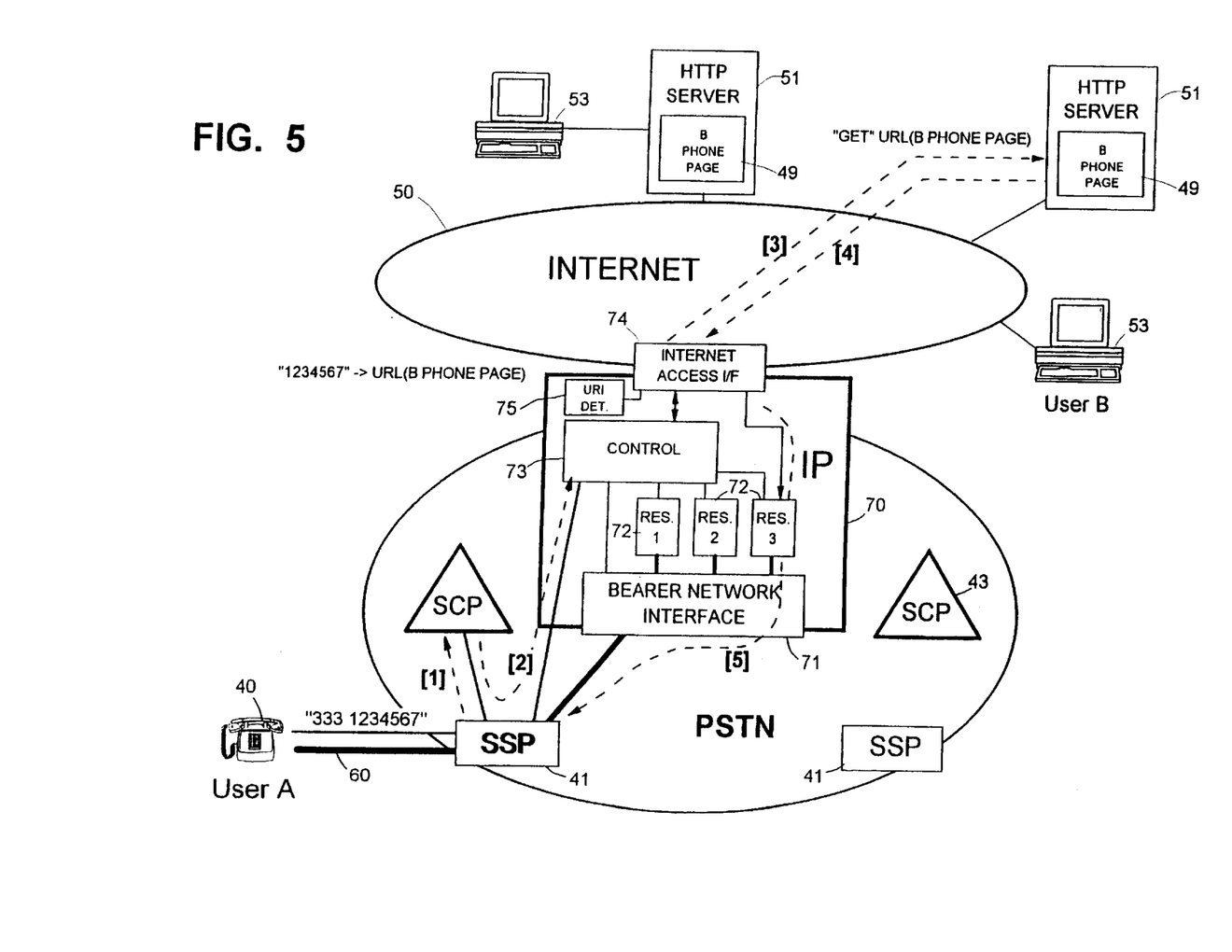
FIG. 5 is a diagram of a first embodiment of the invention in which information (content) items are held on HTTP servers accessible both by an IP of a PSTN and by Web users.

FIG. 5 shows a first embodiment of the invention in which users of a PSTN can access content resources provided on WWW servers. More particularly, the PSTN includes SSPs 41, SCPs 43, and an IP; for reasons of clarity, neither the bearer network (the access network 11 and inter-exchange network 13 of FIGS. 1 and 2) nor CCS network connections are explicitly shown in FIG. 5 except for those parts active in relation to the information service to be described hereinafter. It will be appreciated that the FIG. 5 representation of a PSTN is highly diagrammatic.

The SCPs 43 operate in a conventional manner responding to service requests from SSPs 41 to run specific SLPs on particular data according to information contained in the service request, and to send back to the requesting SSP appropriate instructions for effecting call set up or other service provision. A service request is generated by the SSP in response to predetermined trigger conditions being met at a trigger check point, there being one or more such check points in the course of handling a call.

An SCP 43 may make use of the resources provided by IP 70 to provide a particular service. IP 70 comprises a bearer network interface 71 for providing bearer channel connectivity to the IP; various resources 72 such as a DTMF number collection resource (resource 1), and a voice announcement relay unit (resource 2) for playing back recorded announcements held locally at the IP; and control functionality 73, comprising the RCEE, that is arranged to control the resources 72 and interface 71 in accordance with signalling messages received over the CCS network from an SCP 43 executing an SLP (such messages will generally be routed via the SSP that initiated the service request as the latter also needs to set up a bearer channel to the IP). The interface 71 includes switching functionality to permit the appropriate resource to be connected to the right bearer channel, it being appreciated that the IP is designed to be able to provide resources concurrently to multiple bearer channels routed to the IP.

According to the present embodiment of the invention, IP 70 is also provided with an access interface 74 to the Internet 50 in order to make use of certain content items 49 during the course of processing at least some of the requests from an SCP 43. These content items 49 are held as WWW pages on HTTP servers 51 connected to the Internet 50. The WWW pages containing these content items are referred to below as "phone" pages because they are tailored for access via the PSTN. The phone pages are read accessible over the Internet using respective URLs or URNs (for convenience, the more general term URI will be used hereinafter to mean the Internet-resolvable indicator of the location of a phone page).

The content items may be any type of information that can usefully be passed over the PSTN bearer network to an end user, possibly after a conversion of form at the IP 70. For example, one content item make take the form of a text message that after copying to the IP 70 can be converted to speech by a text-to-voice converter resource 72 of the IP for delivery to a bearer channel. Another content item may be in the form of a digitised speech file which if of suitable P.M. format can be used by IP 70, without substantial conversion, for delivery to a bearer channel by IP 70 (assuming that such channel is digital). Still another form of content item might be a program or other data file that again might not need substantial conversion at IP.

Each content item 49 is known to the PSTN world by a predetermined content code. This code will generally be made up of all or part of a telephone number (called or calling party number) possibly supplemented either by user-input choice information or point-in-call information. In the present embodiment, an SCP 43 wishing to retrieve a content item determines the relevant content code and passes it to the IP 70. The Internet access interface 74 of IP 70 then uses this content code to determine the URI of the corresponding content item which it thereafter retrieves using the HTTP GET request. A fuller explanation of content codes and of the derivation of URIs from these codes is given hereinafter.

FIG. 5 illustrates a simple example of content item access where a PSTN user wishing to access a particular content item (in this case, an item held on phone page 49 of user B) need only dial a corresponding telephone number, for example, "333 1234567" using the telephone keypad (typically a 12 key press-button pad). In this example, the first part of the telephone number "333" is actually a service designator pre-specified by the PSTN operator as characteristic of a content-item retrieval request. The second part of the telephone number "1234567" is the actual content code for the desired item. As regards the nature of the content item, it will be taken to be a text string that can be converted to speech by resource 72 (resource 3) of the IP 70.

Functioning of the information retrieval service for this content item proceeds as follows:

[1] Upon a user (here, User A) dialling the telephone number "333 1234567" on phone 40, the connected SSP recognises the leading string "333" as indicating that the information retrieval service is required and it therefore passes an appropriate service request to SCP 43 together with the remainder of the dialed number, that is, "1234567".

[2] SCP 43 runs an instance of the SLP corresponding to the requested service and this results in a request being sent to IP 70 via SSP 41 for the retrieval and delivery of the content item identified by content code "1234567".

[3] Control functionality 73 asks the Internet access interface 74 to retrieve the required content item. Interface 46 first determines the URI of the content item from the supplied content code and then sends a GET request over the Internet 50 to the appropriate HTTP server 51.

[4] The content item held on the identified phone page 49 is returned from server 51 over the Internet to the access interface 74 where it is temporarily stored.

[5] Upon the retrieved content item having been fully received at interface 74, the control functionality 73 causes the content item to be passed to the text-to-speech resource 72 and controls the bearer network interface 71 to pass the output of this resource to the appropriate bearer channel set up to the IP 70 from SSP 41. The content item is thereafter delivered as speech over bearer circuit 60 to phone 40. Upon the playback of the content item being completed, the control functionality 73 of IP 70 signals this to SCP 43 and the corresponding SLP then resumes control (this may simply involve initiation of call termination or the user may, for example, be given the choice of replaying the content item).

The selection of the appropriate resource 72 of IP 70 for the delivery of a particular content item may be effected in various ways. For example, the resource 72 required for each content item could be held in a database accessible by the control functionality 73; alternatively, a different initial designator string could be used for different forms of content item so that the SCP could then use this string to instruct the control functionality 73 regarding which resource 72 to use for the content item concerned. A preferred arrangement, however, is to associate a content type indicator with the content item (for example, an appropriate MIME type) and then have the control 73 select the delivery resource according to the indicated content type.

Of course, it is possible that no reply is forthcoming to the GET request [31] and the control functionality 73 must therefore be prepared to deal with this by setting a time out period. If no reply is received within this period, the control 73 could either play a predetermined "item unavailable" announcement, or it could report the problem to the controlling SLP executing on SCP 41, it then being the responsibility of the SLP to decide what action to take next.

Although in the FIG. 5 embodiment it is the Internet access interface of IP 70 that is responsible for deriving the URI of the required content item from the corresponding content code, it would alternatively be possible to arrange for the SCP 43 to effect URI determination. In this latter case, the SCP 43 would pass the IP 70 the URI of the required content item rather than its content code.

The FIG. 5 arrangement thus permits a PSTN user to have access to information (content) items stored on WWW servers 51 simply by dialling an appropriate number. It is envisaged that a whole range of information items could be made available this way, each item being associated with a respective content code. All an information provider needs to do to make available this information is to place it on a WWW server and have the PSTN operator assign a code to the corresponding URI.

A possible variant would be for the content code to be set by the calling party number. In this case, the PSTN operator would offer a service (for example, designated by a dialed number string "334") which would automatically take the calling party number and use it as a content code for looking up particular information of interest to the user. For example, a user may want a daily update on a particular subject; to this end, the user has an information provider place daily-updated information on a WWW server at a predetermined URI. The user then agrees with the PSTN operator that his calling-party number when treated as a content code should map to that URI. Thereafter, when the user dials the number "334", his calling-party number is automatically mapped to the URI of the desired information which is then retrieved and delivered by IP 70. In order to allow a user to choose between several information sources, the service designator could be followed by a selection code (for example, one of 0 to 9) that is added to the calling party number to define a content code, each such code mapping to a different URI corresponding to a different content item.

Figure 6:
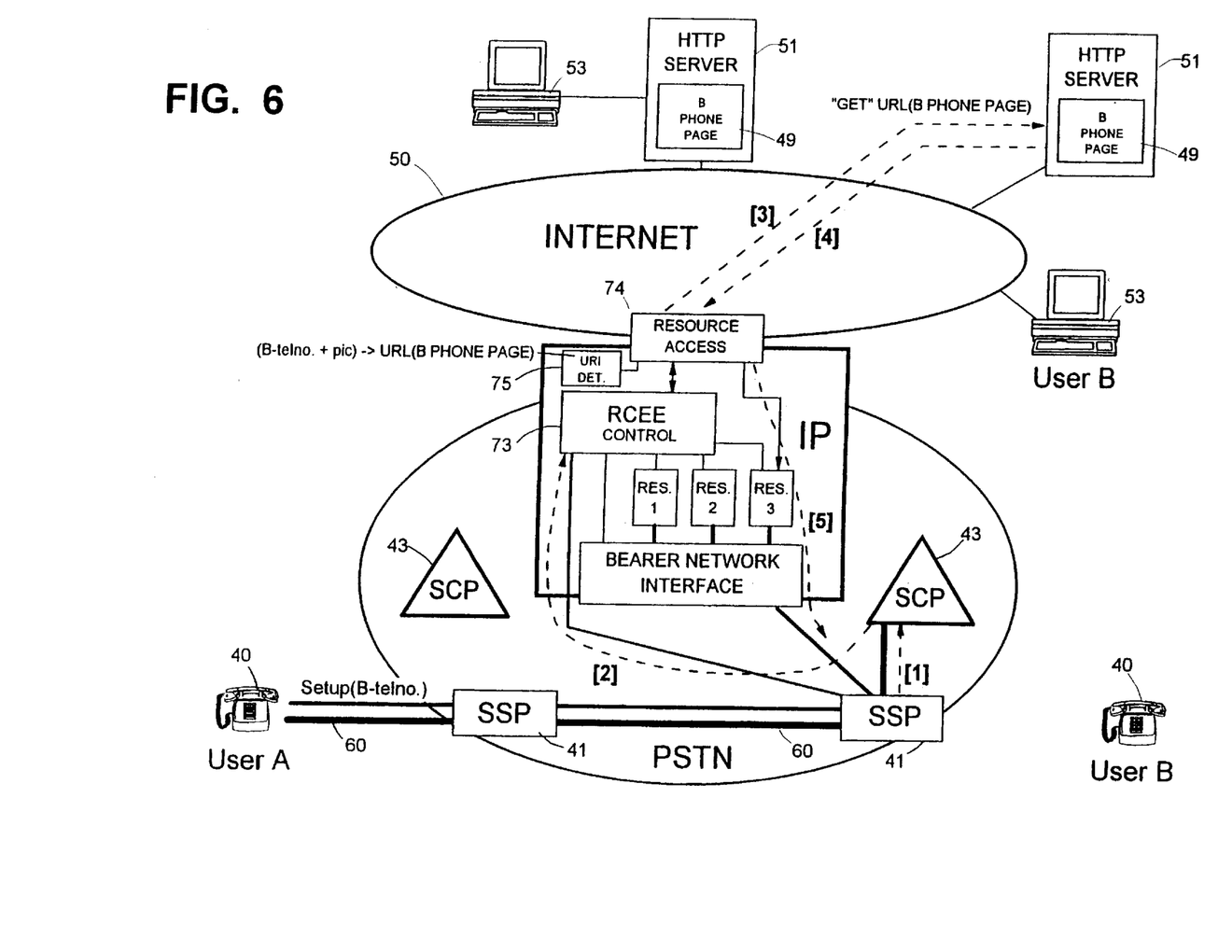
FIG. 6 is a diagram similar to that of FIG. 6 but showing a different use of the content items.

For both the FIG. 5 arrangement and the foregoing variant, the retrieval of the required content item constitutes the service being provided to User A who is the direct requester of the item. FIG. 6 illustrates for the same infrastructure as FIG. 5, a different usage of content items stored on HTTP servers 51. In the FIG. 6 example, a particular content item is retrieval and delivered to User A simply as part of another service, namely a called party service (a calling party service could also have been chosen to illustrate this different usage).

Referring more specifically to the FIG. 6 example, User B has specified on his phone page 49 a message (content item) to be played back to a caller (here, user A) if user B's phone is engaged. The playing of this message is thus triggered at B's SSP 41 at the appropriate trigger check point. A "personalised engaged message" service is then initiated and operates as follows:

[1] a service request is passed from SSP 41 to SCP 43 together with the called party number (B's telephone number).

[2] SCP 43 runs an instance of the SLP corresponding to the requested service and this results in a request being sent to IP 70 via SSP 41 for the retrieval and delivery of the content item identified by content code corresponding to B's telephone number plus an indicator of the relevant point-in-call (in this way, B can define different content items for different events during call set up/takedown, each item having its own code and being at a different URI).

[3] Control functionality 73 asks the Internet access interface 74 to retrieve the required content item. Interface 46 first determines the URI of the content item from the supplied content code and then sends a GET request over the Internet 50 to the appropriate HTTP server 51.

[4] The content item held on the identified phone page 49 is returned from server 51 over the Internet to the access interface 74 where it is temporarily stored.

[5] Upon the retrieved content item having been fully received at interface 74, the control functionality 73 causes the content item to be passed to the text-to-speech resource 72 (resource 3) and controls the bearer network interface 71 to pass the output of this resource to the appropriate bearer channel set up to the IP 70 from SSP 41. The content item is thereafter delivered as speech over bearer circuit 60 to User A's phone 40. Upon the playback of the content item being completed, the control functionality 73 of IP 70 signals this to SCP 43 and the corresponding SLP then resumes control (this may simply involve initiation of call termination or User A may be offered follow-up options such as being switched to B's voicemail).

It may be noted that in the FIG. 6 example, the party to which the retrieved content item is actually delivered is not the party who designated this item for delivery.

Locating and Accessing Content Items

As already indicated, it is the function of the Internet access interface 74 to access a desired content item when passed a content code. To do this, the interface 74 determines the corresponding URI from the content code by utilising the capabilities of a URI determination block 75. Before describing how block 75 determines the correct URI, more detail will be given concerning content codes.

Content Codes—From the foregoing description it will be appreciated that a content code will generally be constituted by all or part of a dialed number or calling party number possibly supplemented by further user-input selection digits or point-in-call data. Further, it will be appreciated that in general, a party providing content items for access over the Intenet will want to specify a plurality of content items. Whilst each such item must be identifiable by its own content code, rather than having each item held on its own phone page accessible by a unique URI derivable from the corresponding content code, it may be more practical to have several content items residing on the same page with the URI of this page being derivable from a common part of the corresponding content codes. In this case, each code will also include a further part by which the desired item can be identified amongst those on the same page. The common code part is referred to below as the URI Identifier (UI) part and the further part as the Relative Item Identifier (RII) part.

Typically, where a content code refers to one item amongst several on a phone page, the UI part of the content code will be formed by the calling or called party number (normally excluding any service designator) whilst the RII part will be formed by a user-input selection digit or a point-in-call identifier.

Where only one content item is stored on a phone page, the corresponding content code may be considered as comprising only a UI part.

Content Access—The URI determination block 75 determines the URI of a required item from the UI part of the corresponding content code. If the content code also includes a RII part, two possibilities exist for selecting the desired item from the phone page identified by the URI corresponding to the UI part of the code. Firstly, the RII code part could be passed to the relevant HTTP server 51 which is then responsible for extracting the correct content item and returning it to the access interface 70. Secondly, the whole relevant phone page could be requested and received by the access interface 74 which is then responsible for extraction of the correct content item.

URI Determination from Content Code—The implementation of the URI determination block 75 will next be considered. Block 75 may be implemented in a variety of ways, four of which are described below:

Direct Input

In cases where the calling party wishes to access a particular content item, it would be possible, though not necessarily convenient, to arrange for the calling party to dial an input which can be directly interpreted as the required URI. The calling party may thus input the host id component of the URI required (either in the form of a host domain name or host IP address) plus the path component of the URI. This input would normally follow the service designator string which itself would indicate that the following input should be read as an URI. As regards the input means, where a user only has a standard 12 key telephone, input of host domain names and other URI elements requiring alpha characters, will need to be done using one of the standard techniques for alpha input from a phonepad (such techniques are already used, for example, to enable a calling party to "spell" out the name of the called party). It would also be possible to provide users with a full alphanumeric keypad to facilitate URI input.

Computation

Content item access over the Internet could be restricted to a set of dialed numbers from which it was possible to compute a corresponding URI according to a predetermined function; in this case, this computation would be the responsibility of block 75.

Association Table Lookup

Probably the simplest implementation for the block 75 is as an association table (either in memory or held on database disc store) associating a URI with the UI part of each content code.

DNS-Type Lookup

An alternative lookup solution is to use a hierarchically-structure distributed database system, similar to (or even part of) the Domain Name System (DNS) of the Internet, in order to resolve the UI part of a content code to a corresponding URI. This approach would typically involve databases maintained by each PSTN operator-for its numbers with which URIs are associated. These databases would be accessible by all PSTNs through a network such as the Internet with resolution requests being pointed to the appropriate database in a manner similar to the Domain Name System. In this case, the block 75 is constituted by an appropriate resolution program arranged to request UI resolution over the Internet through interface 74. Further details of such a system are given in the following International Patent Applications assigned to the same assignee and incorporated herein by reference:

PCT/GB96/03048 filed Dec. 11, 1996 "Method of providing telecommunication services"

PCT/GB96/03049 filed Dec. 11, 1996 "Call setup gateway for telecommunications system"

PCT/GB96/03051 filed Dec. 11, 1996 "Method of providing telecommunication services"

PCT/GB96/03054 filed Dec. 11, 1996 "Method of accessing a target entity over a communications network"

PCT/GB96/03055 filed Dec. 11, 1996 "Method of-accessing service resource items that are for use in a telecommunications system"

Provisioning Content Items

Consideration will next be given as to how the content items 49 are provisioned to the servers 51 and subsequently updated.

So far as provisioning is concerned, two basic actions are required: firstly, the content item must be placed on a server 51 and secondly, the URI of the content item must be notified to the PSTN operator for the service concerned along with the content code (number plus any other condition such as point in call or if multiple content items are provided, the RII values of these items). This notification process will be referred to hereinafter as 'registering' the content item with the PSTN operator; registration is, of course, necessary to enable the operator to program the network entities appropriately. For certain services, it is the operator rather than the User who will specify the content code as part of the registration process.

As to the process of placing a content item on a server 51, how this is carried out will depend on the attitude of the PSTN operator to the possible content of such content items (accuracy, decency, . . . ).

Assuming for the moment that an operator has no concerns about the nature of content items, then how an item is placed on a server 51 will largely depend on the nature of the server concerned. For example, if a user has a computer with network access to the Internet and this computer is used as server 51, then the user can simply load a desired resource onto the server as a WWW phone page for external access. A similar situation arises if the server is an organisation server to which the server has access over an internal LAN or intranet. In both these latter cases, loading the content item as a WWW phone page does not itself require Internet access. However, if the server 51 is one run by an external Internet service provider, then a user can arrange to download the required content item into the user's allocated Web site space on the server, this may or may not involve Internet access. One special case of this latter scenario is where the PSTN operator provides a special server for user phone pages containing content items.

Except where a user's own computer acts as server 51, placing a content item on a server will generally involve clearing one or more levels of password protection.

If the PSTN operator wishes to have control over the content items 49, two approaches are possible. Firstly, the operator could require that every item (or, possibly, a particular subset) had to be subject to a verification process before use, appropriate measures then being taken to avoid subsequent alteration of the item by the user (except, possibly, for particular data items); in this respect, the operator could require that the content item be placed on a server under the operator's control and to which the user had no write access (except possibly for altering particular data items, as indicated above). A second approach suitable for personalised call set up messages is for the operator to provide standard content items to which a user could add the user's own name and other limited elements; the customised item would then be loaded onto a server 51 controlled by the operator. Where the content item takes the form of text, this process can be conveniently implemented for a particular resource using an HTML "form" which a user could download over the WWW from the operator-controlled server. After completing the form and activating a 'commit' graphical button of the form, the entered information would be 'posted' back to the server where the information would be used to produce a customised content item thereafter placed on the server for access over the Internet. An advantage of this approach is that registration of the content item with the operator is simultaneously effected. (It may be noted that if registration needs to be done as a separate act from having a content item loaded on a server, then using an HTML form is a very convenient way to implement the registration process).

From the foregoing it can be seen that whilst the provisioning process does not necessarily require information to be passed over the Internet, in many cases this will be the best solution, particularly if an HTML form exchanged over the WWW can be used to produce a customised content item. It should be noted that producing a customised content item using an HTML form is not limited to cases where the PSTN operator controls the server.

Variants

Many variants are, of course, possible to the above-described arrangements and a number of these variants are described below.

Although the described embodiments of the invention have concentrated on the retrieval of information (content) items from Internet servers (not necessarily, but preferably HTTP servers) for delivery to a user through a telephone handset, the flow of content items could equally be in the opposite direction, that is from the handset (or other CPE) to an Internet server. In this latter case, the server may receive and store the uploaded content item or process it in some way; the server can thus be considered as being a content "sink". In similar terms, when the server delivers content items to the telephone network, it can be considered as a content "source". In both cases, the server is a content "resource" accessible to the telephone user. It will be appreciated that when a content item is being passed from an item of CPE to an Internet server, the role of the IP 70 is first to store the content item being supplied from the CPE and then to deliver this item (possibly after changing its form) over the Internet to the content sink identified by the user by a corresponding content code. Note that in this more general scheme, content codes can best be considered as identifying content sources and sinks rather than particular content items.

The passing of a content item to a content sink may itself constitute the service being implemented (analogously with the FIG. 5 situation for retrieval of an item from a content source); alternatively, the passing of a content item to a content sink may be part of a larger called/calling party service (analogously with the FIG. 6 case)—for example, following on from step [5] of FIG. 6, User A may leave a message for User B, this message being treated as a content item which is passed over the Internet for storage on the server 51 to which B has access.

It will be appreciated that the role of the SCP in the described embodiments could be carried out by any other suitable service controlling entity such as an Adjunct or service node SN; in this latter case, the IP 70 is preferably IP functionality provided in the SN.

In the described embodiments, the process of service identification took place during call setup/takedown and it was the PSTN (in particular the SCP 43 and IP 70) that was responsible for service implementation. Another possibility would be for the PSTN to play a passive role simply setting up a call from a user telephone to ISP equipment external to but connected with the PSTN. This ISP equipment would also have connectivity to the Internet. In this case, after initial call set up to the ISP equipment, the telephone user would dial in the content code of the required content resource. The ISP equipement would then proceed to derive the URI of the content resource from the input code and access that resource in the manner already described for IP 70.

It will be appreciated that the term "Internet" is to be understood to include not only the current specification of the TCP/IP protocols used for the Internet and the current addressing scheme, but also evolutions of these features such as may be needed to deal with isochronous media. Furthermore, references to the WWW and the HTTP protocol should equally be understood to encompass their evolved descendants.

The present invention can also be applied to telephone systems other than just PSTNs, for example to PLMNs and other mobile networks, and to private systems using PABXs. In this latter case, a LAN, campus-wide computer network, or other intranet serving generally the same internal users as the PABX, will take the role of the Internet in the described embodiments.

What is claimed is:

1. A method of making available content sources to users of a telephone network, said content sources being provided on at least one server connected to a computer network that is generally accessible to users of the telephone network but logically distinct therefrom, and said content sources each being associated with a respective predetermined code and being locatable on said computer network by corresponding known URls; said method including the steps of:

(a) during the course of a call involving a user telephone connected to said telephone network, determining conditions indicative that a said content source is to be accessed and thereupon forming the said predetermined code of the required said content source, step (a) involving the use of a number input from said user telephone;
   (b) mapping said predetermined code to the said known URI of the content source associated with that predetermined code;
   (c) utilizsing the URI derived in step (b) to access the required content source over said computer network; and
   (d) transferring content through said networks from said content source to said telephone;

steps (a) and (b) being carried out within the telephone network and steps (c) and (d) involving intelligent peripheral functionality of the telephone network.

2. A method according to claim 1, wherein in step (a) the determining of conditions indicative that a said content source is to be accessed involves recognizing a predetermined service designator code input using said user telephone, and the forming of said predetermined code involves using numbers input following said designator code at least as a major part of said predetermined code for the required content source.

3. A method according to claim 1, wherein in step (a) the determining of conditions indicative that a said content source is to be accessed involves recognizing a predetermined service designator code input using said user telephone, and the forming of said predetermined code involves using the telephone number of said user telephone at las a major part of said predetermined code for the required content source.

4. A method according to claim 1, wherein step (a) involves recognising predetermined service trigger conditions at a node of said telephone network during one of call setup and takedown, recognition of said predetermined service trigger conditions resulting in the initiation of a corresponding service in which the said content resource to be accessed is to be used.

5. A method according to claim 4, wherein said service is a called-party service and step (b) involves using a called party number input at said user telephone at least as a major part of said predetermined code for the required content source.

6. A method according to claim 5, wherein said content transferred in step (d) is a message provided to said user telephone as part of said called-party service.

7. A method according to claim 5, wherein multiple content items are held on said content source, step (a) further involving collecting an indicator of the required said content item, and step (d) using this indicator to transfer only the required content item to said user telephone.

8. A method according to claim 7, wherein said indicator is a number input from said user telephone.

9. A method according to claim 7, wherein said indicator is a point-in-call indicator.

10. A method according to claim 1, wherein in step (b) said URI is derived from the corresponding said predetermined code by look up in an association table associating said predetermined code and URI, said association table being held on at least one database server connected to said computer network, step (b) involving accessing said database server over the computer network to determine the said URI corresponding to the said predetermined code.

11. A method according to claim 10, wherein said at least one database server is provided by a DNS-type distributed database system in which said URIs are held in records associated with respective names, herein referred to as domain names, by which the records can be retrieved, step (b) involving translating said predetermined code into a corresponding said domain name and using this domain name to retrieve the URI of the required content source item from said DNS-type distributed database system.

12. A method according to any one of the preceding claims, wherein said computer network in the Internet and said telephone network is a PSTN.

13. A telephone network comprising a bearer network with service switching points, a service control subsystem, and intelligent peripheral functionality; characterized in that:

said intelligent peripheral functionality is connected to a computer network that is generally accessible to users of the telephone network but logically distinct therefrom;
   said service switching point includes means for determining during call setup involving a user telephone connected to said bearer network, conditions indicative that a content-item access service is required involving accessing a content item provided at a particular URI on a server connected to said computer network, said content item having an associated predetermined code;
   said service control subsystem includes means responsive to the service switching point determining that said content-item access service is required, to form said predetermined code using at least a part of a number input from said user telephone;
   one of said service control subsystem and intelligent peripheral functionality has mapping means for mapping said predetermined code to the said particular URI of the content item to be accessed; and
   said intelligent peripheral functionality os operative to use the URI derived by said mapping means to access the required content item over said computer network and transfer it to said user telephone.

14. A method of making available content sinks to users of a telephone network, said content sinks being provided on at least one server connected to a computer network that is generally accessible to users of the telephone network but logically distinct therefrom, and said content sinks each being associated with a respective predetermined code and being locatable on said computer network by corresponding known URls; said method including the steps of:

(a) during the course of a call involving a user telephone connected to said telephone network, determining conditions indicative that a said content sink is to be accessed and thereupon forming the said predetermined code of the required said content sink, step(a) involving the use of a number input from said user telephone;

(b) mapping said predetermined code to the said known URI of the content sink associated with that predetermined code; and (c) transferring content from said user telephone through said telephone network and then over said computer network to said content sink, the URI derived in step (b) being used to access the content sink over said computer network for effecting this content transfer;

steps (a) and (b) being carried out within the telephone network and step (c) involving intelligent peripheral functionality of the telephone network.

15. A method according to claim 14, wherein in step (a) the determining of conditions indicative that a said content sink is to be accessed involves recognizing a predetermined service designator code input using said user telephone, and the forming of said predetermined code involves using numbers input following said designator code at least as a major part of said predetermined code for the required content sink.

16. A method according to claim 14, wherein in step (a) the determining of conditions indicative that a said content sink is to be accessed involves recognizing a predetermined service designator code input using said user telephone, and the forming of said predetermined code involves using the telephone number of said user telephone at least as a major part of said predetermined code for the required content sink.

17. A method according to claim 14, wherein in step (a) involves recognizing predetermined service trigger conditions at a node of said telephone network during one of call setup and takedown, recognition of said predetermined service trigger conditions resulting in the initiation of a corresponding service in which the said content sink to be accessed is to be used.

18. A method according to claim 17, wherein said service is a called-party service and step (b) involves using a called party number input at said user telephone at least as a major part of said predetermined code of the required content sink.

19. A method according to claim 14, wherein in step (b) said URI is derived from the corresponding said predetermined code by look up in an association table associating said predetermined code and URI, said association table being held on at least one database server connected to said computer network, step (b) involving accessing said database server over the computer network to determine the said URI corresponding to the said predetermined code.

20. A method according to claim 19, wherein said at least one database server is provided by a DNS-type distributed database system in which said URIs are held in records associated with respective names, herein referred to as domain names, by which the records can be retrieved, step (b) involving translating said predetermined code into a corresponding said domain name and using this domain name to retrieve the URI of the required content sink item from said DNS-type distributed database system.

21. A method according to claim 14, wherein said computer network is the Internet and said telephone network is a PSTN.

22. A content retrieval system for retrieving over the Internet content held on HTTP servers at predetermined URLs and delivering the retrieved content over a telephone system to a telephone user, said system comprising:

a telephone-system interface for receiving selection data through the telephone system from a user phone, and for sending back to that phone retrieved content in audible form;

mapping apparatus comprising a storage device holding mappings between selection data and URLs, and user-input apparatus for receiving HTTP-protocol messages over the Internet from telephone users specifying said mappings in terms of the particular predetermined URLs to be associated with particular selection data, the user-input apparatus setting the mappings held on the storage device according to these messages;

control apparatus responsive to the receipt at the telephone interface of selection data, to access the mapping apparatus to retrieve the predetermined URL corresponding to the particular selection data received;

Internet interface apparatus for retrieving over the Internet content held on HTTP servers at predetermined URLs specified to it by said control apparatus, and for converting the retrieved content into an audible form for sending through the telephone system by the telephone-system interface.

23. A system according to claim 22, wherein said selection data comprises at least a part of one of:

a number input from said user telephone, and the telephone number of said user telephone.

24. A system according to claim 22, wherein the system incorporated into at least one node of the telephone system.

25. A system according to claim 22, wherein the system is incorporated into ISP equipment provided at the boundary of the telephone system.

* * * * *

UNITED STATES PATENT AND TRADEMARK OFFICE
CERTIFICATE OF CORRECTION

PATENT NO. : 6,243,443 B1
DATED : June 5, 2001
INVENTOR(S) : Colin Low et al.

It is certified that error appears in the above-identified patent and that said Letters Patent is hereby corrected as shown below:

Column 17,
Line 24, change "utilizsing" to -- utilizing --
Line 46, change "at las a major" to -- at least as a major --

Column 18,
Line 50, change "functionality os operative" to -- functionality is operative --

Signed and Sealed this

Second Day of August, 2005

JON W. DUDAS
*Director of the United States Patent and Trademark Office*